United States Patent [19]

Le Blanc

[11] Patent Number: 5,011,625
[45] Date of Patent: Apr. 30, 1991

[54] AUTOTHERMAL STEAM REFORMING PROCESS

[75] Inventor: Joseph R. Le Blanc, Houston, Tex.

[73] Assignee: The M. W. Kellogg Company, Houston, Tex.

[21] Appl. No.: 448,422

[22] Filed: Dec. 11, 1989

[51] Int. Cl.$^5$ .............................. C10J 1/02; C01B 3/38
[52] U.S. Cl. ..................................... 252/376; 252/373
[58] Field of Search ......................................... 252/376

[56] References Cited

U.S. PATENT DOCUMENTS

| | | | |
|---|---|---|---|
| 2,579,843 | 12/1951 | Mader ................................. | 252/373 |
| 3,442,613 | 5/1969 | Grotz ................................... | 23/199 |
| 4,337,170 | 6/1982 | Fuderer .............................. | 252/373 |
| 4,376,758 | 3/1983 | Pagani et al. ...................... | 423/359 |
| 4,442,020 | 4/1984 | Fuderer .............................. | 252/373 |
| 4,479,925 | 10/1984 | Shires et al. ....................... | 423/359 |
| 4,650,651 | 3/1987 | Fuderer .............................. | 422/191 |
| 4,666,680 | 5/1987 | Lewis ................................. | 422/191 |
| 4,690,690 | 9/1987 | Andrew et al. .................... | 48/214 A |
| 4,741,885 | 5/1988 | Herbort et al. ..................... | 422/197 |
| 4,750,986 | 6/1988 | Pinto .................................. | 208/64 |
| 4,792,441 | 12/1988 | Wang et al. ........................ | 423/359 |
| 4,824,658 | 4/1989 | Karafian et al. ................... | 423/652 |

Primary Examiner—Howard T. Mars
Attorney, Agent, or Firm—The M. W. Kellogg Company

[57] ABSTRACT

Ammonia synthesis gas is produced by reaction of steam, an oxidant, and a major portion of fresh hydrocarbon feed in an exothermic catalytic reforming zone to a first reformed gas having very low methane content. The balance of the fresh feed is reacted with steam in an endothermic catalytic reforming zone to a second reformed gas having a low methane content. The first and second reformed gases are combined and passed in indirect heat exchange with reactants in the endothermic reforming zone to provide all of the heat required therein and are then recovered as raw ammonia synthesis gas.

6 Claims, 1 Drawing Sheet

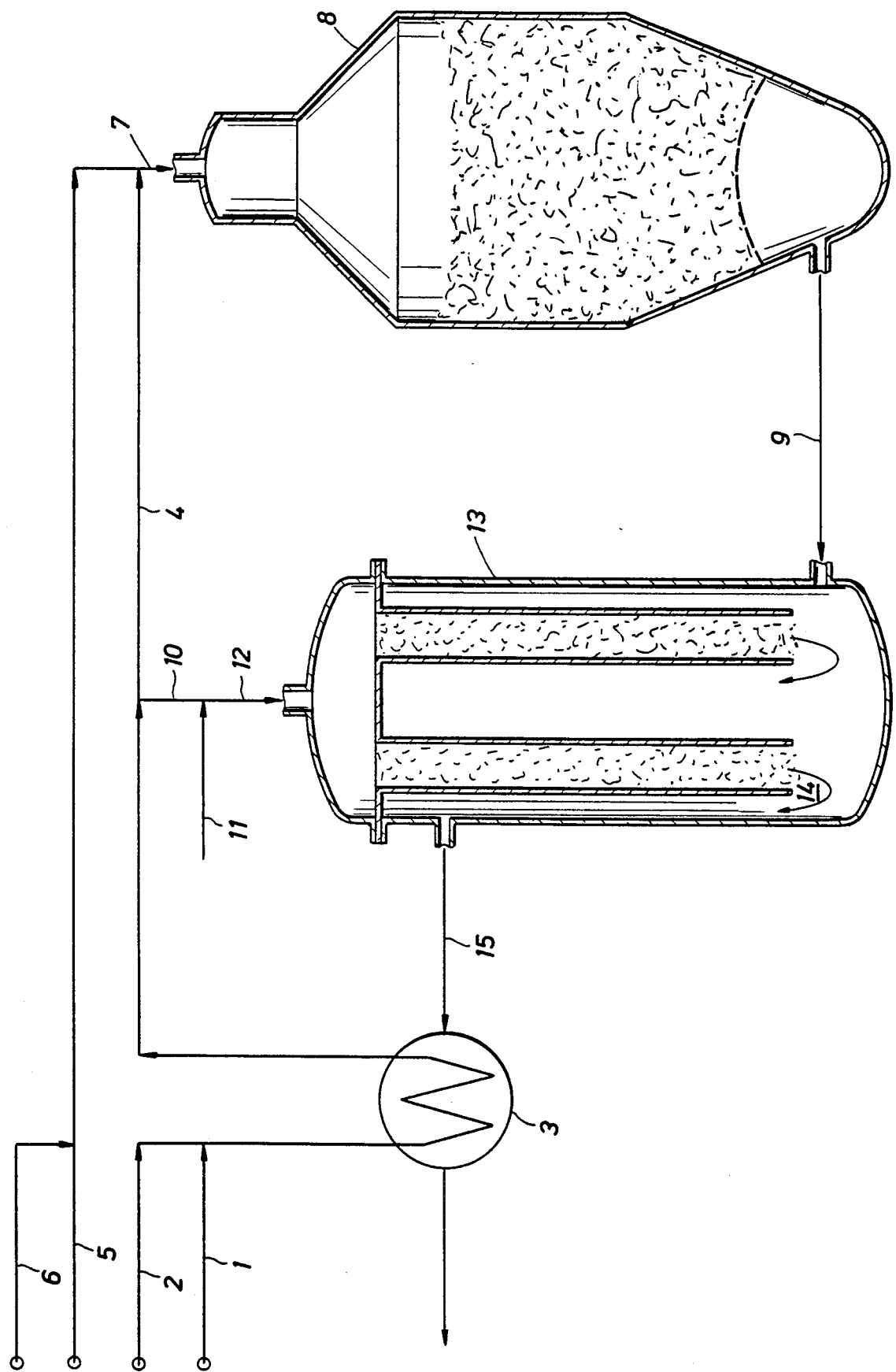

AUTOTHERMAL STEAM REFORMING PROCESS

This invention relates to production of ammonia from hydrocarbons such as natural gas and specifically relates to production of ammonia synthesis gas, hydrogen, and nitrogen, with reduced fuel gas requirements made possible by deletion of the fired tube primary reforming furnace customarily employed in commercial practice.

The customary steps of primary and secondary reforming to produce ammonia synthesis gas are well known both technically and economically. From the latter viewpoint, these steps are recognized as controlling factors in determining the "feed and fuel" requirements for each unit of ammonia produced because both steps require heat from combustion of hydrocarbon for the endothermic reaction of steam with hydrocarbon feed.

Commercial primary- reformers are fuel fired furnaces having large tubes filled with nickel-containing catalyst wherein approximately 60 volume percent of the fresh hydrocarbon feed is converted with added steam to hydrogen and carbon oxides. This primary reformed gas additionally contains unreacted steam and the balance of the hydrocarbon feed as methane. From the process viewpoint, the primary reformer is an endothermic catalytic steam reforming zone.

Primary reformed gas is introduced to the secondary reformer which is typically a refractory-lined vessel filled with nickel-containing catalyst and has no provision for supply of external heat. In secondary reforming, heat for endothermic reaction of the remaining methane with steam is supplied by combustion of part of the primary reformed gas with externally supplied air which is the source of nitrogen for the final ammonia synthesis gas. From the process viewpoint, the secondary reformer is an exothermic catalytic steam reforming zone and is sometimes referred to as an autothermal reformer.

Raw, hot synthesis gas from the secondary reformer is comprised of hydrogen, nitrogen, carbon monoxide which is subsequently converted to additional hydrogen, carbon dioxide, unreacted steam, residual methane, and small quantities of inert gases. Customarily, the hot synthesis gas is heat exchanged with boiler feedwater to raise turbine steam required in compression services for secondary reformer air, synthesis gas, and refrigerant employed in ammonia product recovery.

Despite this use, practitioners have long desired to employ heat of the secondary reformer outlet gas in the alternative service of primary reforming through use of a reactor/heat exchanger and thereby minimize size of the conventional fired tube reforming furnace. Ideally, the furnace would be deleted if sufficient primary reforming duty could be moved to the secondary reformer in order to balance heat requirement of the endothermic reforming step with heat availability from the exothermic reforming step. This heat balance requires substantially more combustion in the secondary reformer, hence use of excess air which necessitates downstream removal of excess nitrogen to achieve the desired hydrogen/nitrogen ratio in the final synthesis gas.

Reactor/exchangers proposed for this service have been high temperature heat exchangers having single-pass tubes fixed at each end to tube sheets. While considerably less costly than fired tube furnaces, their high temperature design leads to high fabrication costs. Perhaps more importantly, the large quantity of excess nitrogen in the final synthesis gas which results from the heat balance problem indicated above leads to necessity for an uneconomically large nitrogen rejection system preceding or within the synthesis section of an ammonia plant.

More recently, open-end bayonet tube reactor/exchangers of the general type shown in U.S. Pat. No. 2,579,843 have been considered for primary reforming service because of their more simple design in comparison with single-pass exchangers. In already known designs for production of ammonia synthesis gas which employ open-end bayonet tubes, the heat balance problem mentioned above has precluded elimination of the conventional fired tube reforming furnace.

It is, therefore, an object of this invention to produce ammonia synthesis gas and utilize heat from exothermic catalytic reforming in the endothermic reforming step under such conditions that the entire heat of conversion is furnished from the exothermic reforming step.

According to the invention and contrary to traditional practice, ammonia synthesis gas is produced by introducing a major portion of the fresh hydrocarbon along with steam and an oxidant to an exothermic catalytic steam reforming zone and withdrawing therefrom a first reformed gas. A remaining minor portion of the fresh hydrocarbon is reacted with steam in an endothermic catalytic steam reforming zone and a second reformed gas is withdrawn therefrom which is subsequently combined with the first reformed gas. The resulting combined gases are then passed in indirect heat exchange with reactants in the endothermic catalytic steam reforming zone where they release heat and are subsequently recovered as raw ammonia synthesis gas.

The exothermic catalytic steam reformer zone is operated adiabatically at a pressure between 22 and 70 bar and may be conveniently embodied in the known configuration of a secondary reformer despite the misnomer of that name in the process of the invention. Preferably, from 55 to 85 volume percent of the fresh hydrocarbon feed is introduced to the exothermic reforming zone with steam and an oxidant which are collectively referred to hereinafter as the first mixed feed. The steam and hydrocarbon components of the first mixed feed are preferably first combined and preheated to a temperature between 450° and 650° C. When air is selected as the oxidant, the steam to $C_1$ ratio of the first mixed feed is preferably between 1.5 and 3.5. When oxygen-enriched air is selected as oxidant, oxygen preferably constitutes from 25 to 40 volume percent (dry basis) of the oxidant and the steam to $C_1$ ratio of the first mixed feed is preferably between 2.5 and 3.5. Oxygen for enrichment of air may be supplied by a modestly sized cryogenic, membrane, or pressure swing absorption unit. The choice between use of air or oxygen-enriched air is principally an economic matter governed by size and cost of the oxygen unit, utility costs, and the extent of integration of the ammonia plant energy systems with utility systems of the overall production facility. With either choice, the oxidant is preferably preheated to between 480° C. and 720° C. prior to introduction to the exothermic catalytic steam reforming zone.

Like secondary reformers, the exothermic catalytic steam reforming zone operates autothermally but, unlike conventional systems, the major part of total reforming duty is carried out in this zone, and the autothermal steam reforming conditions are selected to produce a first reformed gas containing hydrogen, carbon oxides, nitrogen, and less than 1.0 volume percent (dry basis) residual hydrocarbon, i.e.—methane, at a temperature preferably between 900° C. and 1100° C.

The endothermic catalytic steam reforming zone also operates at a pressure between 22 and 70 bar but is heated through the catalyst tube walls by the first reformed gas as later described. This zone is preferably embodied in a vertical reactor/exchanger having catalyst-filled bayonet tubes with gas passages at their lower ends. The remaining minor portion of the fresh hydrocarbon feed along with steam, referred to hereinafter as the second mixed feed, is also preheated to a temperature between 450° C. and 650° C., then introduced to the endothermic catalytic steam reforming zone, and reacted to produce a second reformed gas containing hydrogen, carbon oxides, and less than 4.0 volume percent (dry basis) residual hydrocarbon, i.e.—methane, at a temperature typically between 825° C. and 1025° C. Preferably, the steam to $C_1$ ratio of the second mixed feed is between 4.0 and 5.0.

In order to provide the total heat requirement for the endothermic reforming zone, the first and second reformed gases are combined and then cooled by indirect heat exchange with the second mixed feed within the endothermic catalytic steam reforming zone and recovered therefrom as raw ammonia synthesis gas.

Since the raw ammonia synthesis gas is typically recovered at a temperature between 565° C. and 735° C., sensible heat in the gas is preferably recovered by indirect heat exchange with the fresh hydrocarbon feed which is thereby preheated.

Referring now to the drawing, fresh hydrocarbon feed in line 1, preferably saturated with water, is combined with steam in line 2 and preheated in feed/effluent heat exchanger 3. A major portion of the fresh hydrocarbon feed in line 4 is combined with additional steam and oxidant introduced respectively in lines 5 and 6 to form the first mixed feed which is introduced through line 7 to exothermic catalytic steam reformer 8 and there reacted to form the first reformed gas which is recovered through line 9.

A minor portion of the fresh feed in line 10 is combined with additional steam from line 11 to form the second mixed feed which is introduced through line 12 to the catalyst tube side of reformer-exchanger 13 which constitutes an endothermic catalytic steam reforming zone. Catalyst is supported in the open end tubes by screens not shown. A second reformed gas 14 recovered from bottom outlets of the catalyst tubes is combined with the first reformed gas in line 9. The resulting combined gases are cooled by indirect heat exchange with the second mixed feed within the catalyst tubes and recovered from the shell side of reactor-exchanger 13 as raw ammonia synthesis gas through line 15. The raw ammonia synthesis gas is then further cooled in feed/effluent heat exchanger 3 and recovered through line 16 for further heat recovery and processing by already known steps for the production of ammonia.

The following Tables show illustrative examples of relevant operating conditions and stream compositions for alternative designs which employ air or oxygen-enriched air as oxidant in exothermic catalytic steam reformer 8.

TABLE I

| | AIR AS OXIDANT | | | | | | | | | |
|---|---|---|---|---|---|---|---|---|---|---|
| Reference Numeral | 7 | | 9 | | 12 | | 14 | | 15 | |
| Pressure (bar) | 41 | | 40 | | 41 | | 40 | | 39 | |
| Temperature (°C.) | 592 | | 989 | | 539 | | 891 | | 616 | |
| Composition | (1) | (2) | (1) | (2) | (1) | (2) | (1) | (2) | (1) | (2) |
| (1) kg moles/hr | | | | | | | | | | |
| (2) mole % dry basis | | | | | | | | | | |
| $H_2$ | 27 | 0.8 | 1828 | 38.9 | 12 | 3.0 | 1144 | 74.3 | 2972 | 47.6 |
| $N_2$ | 1942 | 56.9 | 1942 | 41.2 | 7 | 1.7 | 7 | 0.4 | 1949 | 31.2 |
| $CH_4$ | 867 | 25.4 | 21 | 0.5 | 371 | 91.6 | 47 | 3.1 | 68 | 1.1 |
| $H_2O$ | 1588 | — | 1500 | — | 1706 | — | 1232 | — | 2732 | — |
| $O_2$ | 518 | 15.2 | — | — | — | — | — | — | — | — |
| CO | — | — | 597 | 12.7 | — | — | 187 | 12.1 | 784 | 12.6 |
| $CO_2$ | 27 | 0.8 | 291 | 6.2 | 12 | 3.0 | 155 | 10.1 | 446 | 7.1 |
| Ar | 25 | 0.7 | 25 | 0.5 | — | — | — | — | 25 | 0.4 |
| $C_2+$ | 7 | 0.2 | — | — | 3 | 0.7 | — | — | — | — |

TABLE II

| | OXYGEN-ENRICHED AIR AS OXIDANT | | | | | | | | | |
|---|---|---|---|---|---|---|---|---|---|---|
| Reference Numeral | 7 | | 9 | | 12 | | 14 | | 15 | |
| Pressure (bar) | 41 | | 39 | | 41 | | 40 | | 39 | |
| Temperature (°C.) | 616 | | 997 | | 502 | | 939 | | 663 | |
| Composition | (1) | (2) | (1) | (2) | (1) | (2) | (1) | (2) | (1) | (2) |
| (1) kg moles/hr | | | | | | | | | | |
| (2) mole % dry basis | | | | | | | | | | |
| $H_2$ | 28 | 1.0 | 1921 | 45.6 | 11 | 2.9 | 1167 | 75.1 | 3088 | 53.7 |
| $N_2$ | 1339 | 46.6 | 1339 | 31.9 | 7 | 1.8 | 7 | 0.5 | 1346 | 23.4 |
| $CH_4$ | 879 | 30.6 | 7 | 0.2 | 359 | 91.7 | 25 | 1.6 | 32 | 0.6 |
| $H_2O$ | 576 | — | 2719 | — | 1712 | — | 1199 | — | 3918 | — |
| $O_2$ | 576 | 20.0 | — | — | — | — | — | — | — | — |
| CO | — | — | 503 | 12.0 | — | — | 209 | 13.5 | 712 | 12.4 |
| $CO_2$ | 28 | 1.0 | 414 | 9.9 | 11 | 2.8 | 145 | 9.3 | 559 | 9.7 |
| Ar | 17 | 0.6 | 17 | 0.4 | — | — | — | — | 17 | 0.3 |
| $C_2+$ | 8 | 0.3 | — | — | 3 | 0.8 | — | — | — | — |

I claim:

1. A method for producing a raw ammonia synthesis gas from a fresh hydrocarbon feed which consists of:

(a) forming a first mixed feed comprising steam, a major portion of the fresh hydrocarbon feed, and an oxidant selected from the group consisting of air and oxygen-enriched air, introducing the first mixed feed to an exothermic catalytic steam reforming zone wherein there is produced a first reformed gas containing less than 1.0 volume percent, dry basis, residual hydrocarbon, and withdrawing the first reformed gas therefrom;

(b) forming a second mixed feed comprising steam and a remaining minor portion of the fresh hydrocarbon feed, introducing the second mixed feed to an endothermic catalytic steam reforming zone wherein there is produced a second reformed gas containing less than 4.0 volume percent, dry basis, residual hydrocarbon, and withdrawing the second reformed gas therefrom;

(c) combining the first and second reformed gases and cooling the combined first and second reformed gases by passing the combined gases in indirect heat exchange with the second mixed feed within the endothermic catalytic steam reforming zone whereby all of the heat required for the endothermic catalytic steam reforming of the second mixed feed therein is provided; and (d) withdrawing and recovering the resulting cooled combined gases as raw ammonia synthesis gas product.

2. The method of claim 1 wherein the major portion of the fresh hydrocarbon feed is between 55 and 85 volume percent of the fresh hydrocarbon feed.

3. The method of claim 2 wherein the fresh hydrocarbon feed is preheated to a temperature between 450° and 650° C.

4. The method of claim 3 wherein the fresh hydrocarbon feed is preheated by indirect heat exchange with the raw ammonia synthesis gas.

5. The method of either claim 1 or claim 3 wherein the oxidant is air preheated to a temperature between 480° and 720° C. the steam to $C_1$ ratio of the first mixed feed is between 1.5 and 3.5, and the steam to $C_1$ ratio of the second mixed feed is between 4.0 and 5.0.

6. The method of either claim 1 or claim 3 wherein the oxidant is oxygen-enriched air preheated to a temperature between 480° and 720°, the steam to $C_1$ ratio of the first mixed feed is between 2.5 and 4.5, and the steam to $C_1$ ratio of the second mixed feed is between 4.0 and 5.0.

* * * * *